(12) United States Patent
Novo Diaz et al.

(10) Patent No.: US 8,543,730 B2
(45) Date of Patent: Sep. 24, 2013

(54) PEER NODE SELECTION IN A PEER TO PEER COMMUNICATION NETWORK

(75) Inventors: Oscar Novo Diaz, Helsinki (FI); Jani Hautakorpi, Masala (FI)

(73) Assignee: Telefonaktiebolaget LM Ericsson, Stockholm (SE)

( * ) Notice: Subject to any disclaimer, the term of this patent is extended or adjusted under 35 U.S.C. 154(b) by 300 days.

(21) Appl. No.: 12/999,917

(22) PCT Filed: Jul. 2, 2008

(86) PCT No.: PCT/SE2008/050827
§ 371 (c)(1),
(2), (4) Date: Dec. 17, 2010

(87) PCT Pub. No.: WO2010/002302
PCT Pub. Date: Jan. 7, 2010

(65) Prior Publication Data
US 2011/0093615 A1 Apr. 21, 2011

(51) Int. Cl.
*G06F 15/173* (2006.01)
(52) U.S. Cl.
USPC ............ 709/238; 709/202; 709/205; 709/224
(58) Field of Classification Search
USPC .................. 709/238, 202, 205, 224
See application file for complete search history.

(56) References Cited

U.S. PATENT DOCUMENTS

| 2002/0062310 | A1* | 5/2002 | Marmor et al. | 707/3 |
| 2002/0156917 | A1* | 10/2002 | Nye | 709/238 |
| 2004/0010553 | A1 | 1/2004 | Katz et al. | |
| 2005/0272421 | A1 | 12/2005 | Vare et al. | |
| 2006/0068703 | A1* | 3/2006 | Ng et al. | 455/41.2 |
| 2007/0234102 | A1 | 10/2007 | Fan et al. | |
| 2007/0299778 | A1* | 12/2007 | Haveson et al. | 705/51 |
| 2008/0200186 | A1* | 8/2008 | Vare et al. | 455/456.2 |
| 2009/0240758 | A1* | 9/2009 | Pasko et al. | 709/201 |

OTHER PUBLICATIONS

International Search Report for PCT/SE2008/050827, dated Feb. 20, 2009.
Written Opinion of the International Searching Authority for PCT/SE2008/050827, dated Feb. 20, 2009.
Second Written Opinion of the International Searching Authority for PCT/SE2008/050827, dated Jun. 7, 2010.
International Preliminary Report on Patentability for PCT/SE2008/050827 dated Sep. 30, 2010.
Office Action issued in corresponding Chinese Patent Application No. 200880130136.7 mailed Feb. 5, 2013, 3 pages.

* cited by examiner

*Primary Examiner* — Nicholas Taylor
(74) *Attorney, Agent, or Firm* — Myers Bigel Sibley & Sajovec

(57) ABSTRACT

A method and apparatus for selecting a peer node in a P2P network. A requesting peer node in the P2P network requests geographical location information relating to a plurality of target peer nodes. In response to the request, the requesting node receives geographical location information for each target peer node. The requesting node uses the geographical location information and other information to select a target peer node. The request may either be sent to each target peer node, or to a central resource record peer node that maintains geographic location information for each target peer node. This allows target peer nodes to be selected on the basis of their location, and provides advantages in terms of trust depending on location, and allowed content depending on location.

9 Claims, 4 Drawing Sheets

PEER NODE SELECTION IN A PEER TO PEER COMMUNICATION NETWORK

CROSS REFERENCE TO RELATED APPLICATIONS

This application is a 35 U.S.C. §371 national stage application of PCT International Application No. PCT/SE2008/050827, filed on Jul. 2, 2008 the disclosure and content of which is incorporated by reference herein in its entirety. The above-referenced PCT International Application was published in the English language as International Publication No. WO 2010/002302 on Jan. 7, 2010.

TECHNICAL FIELD

The invention relates to the field of peer to peer communication networks, and in particular to peer node selection in a peer to peer communication network.

BACKGROUND

Peer to peer (P2P) computer networks utilize connectivity between participants in a network that does not require centralized control or hierarchical organization. Unlike conventional client-server type networks, P2P services or content can be provided by any peer node in the P2P network. The peer nodes provide resources such as bandwidth, processing capabilities and storage capacity, and so in contrast to a conventional client-server network, adding more peer nodes increases the performance and capabilities of the network. P2P networks are also more robust than client-server networks, as peers can obtain the data or services they need from one of many peers, rather rely on one of a few centralized servers.

Another advantage that the lack of centralized servers gives in a P2P network is that individuals can cooperate to form P2P networks without investing in additional high-performance hardware to coordinate it. Furthermore, P2P networks provide a way to aggregate and make use of the tremendous computation and storage resources that remain unused on idle individual computers.

When a peer node wishes to obtain content or services from another peer node in a P2P network, it may decide which other peer node (or peer nodes) to use by measuring latency. Latency measurement techniques, such as sending a ping and receiving a response, give an indication of how quickly the two nodes can exchange data, but provide little more information.

In some circumstances, it may be desirable for a peer node to estimate how close other peer nodes are. Latency measurements can to a certain degree assist with this, but are not entirely reliable. For example, a latency measurement from a close peer node via a poor connection may be higher than a latency measurement from a remote node via a good connection. Furthermore, latency measurements need to be periodically updated, increasing the signalling load in the network.

SUMMARY

The inventors have realised that the geographical location of peers in networks would be useful information for a peer node to use when selecting other peer nodes from the P2P network to provide content or services. In some circumstances, geographical information could be used to limit the provisioning of services or content to a specific area. For example, a P2P network may include peer nodes geographically located in Sweden and Russia, and legislation may allow certain data content in Sweden but not in Russia. The present invention would allow that content to be distributed in the P2P network to peer nodes located in Sweden, but not to peer nodes located in Russia. Geographical location may also be used as a trust mechanism. Peer nodes located in certain areas may be trusted more than peer nodes located in other areas. Geographical location information can be used to create a circle of trust and allow information, content or services depending on trust levels.

According to a first aspect of the invention, there is provided a method of selecting a peer node in a P2P network. A requesting peer node in the P2P network requests geographical location information relating to a plurality of target peer nodes. In response to the request, the requesting node receives geographical location information for each target peer node. The requesting node uses the geographical location information to select a target peer node. This allows target peer nodes to be selected on the basis of their location, and provides advantages in terms of trust depending on location, and allowed content depending on location.

In an optional embodiment, the request is sent to each target peer node. Each target peer node sends a response to the request back to the requesting peer node. In a further option, the request for geographical information is included in a request message relating to services provided. In this way, signalling can be minimised.

In an alternative optional embodiment, the request for geographical information is sent to a resource record peer node. The resource record peer node maintains records of the geographical location of peer nodes in the P2P network. The resource record peer node responds to the request, allowing the requesting node to receive the required geographical location information. In this case, the records of geographical location are optionally maintained in a resource record. The resource record includes information relating to the identity, the services provided by, and the geographical location of each peer node in the P2P network, or just a group of target peer nodes in the P2P network.

The geographical information is optionally selected from any of a civil location, Global Positioning Satellite data, map co-ordinates, or proprietary location information. A civil location may include location data such as a country or town, postal or zip code, a postal address (street name etc) or just a country code (such as US, FI, RU etc.). Map co-ordinates need not just be latitude and longitude, but may also include grid references or other types of map co-ordinate. In a further option, the geographical information is provided by a third party node. An advantage of this is that it allows the peer node to have independent verification of its location. The third party node optionally signs the geographical information, allowing each peer node of the plurality of target peer nodes to authenticate their geographical location information.

According to a second aspect of the invention, there is provided a peer node for use in a P2P network. The peer node is provided with a transmitter for sending a request for geographical location information relating to a plurality of target peer nodes. A receiver is also provided for receiving, in response to the request, geographical location information for each target peer node of the plurality of target peer nodes. A processor is provided for selecting a target peer node on the basis of the received geographical information. This allows target peer nodes to be selected on the basis of their location, and brings advantages in terms of trust depending on location, and allowed content depending on location.

The transmitter is optionally arranged to send the request for geographical location information to each target peer node of the plurality of peer nodes, in which case the receiver is arranged to receive geographical location information from each target peer node of the plurality of target peer nodes.

In an alternative option, the transmitter is arranged to send the request for geographical location information to a resource record peer node, in which case the receiver is arranged to receive geographical location information for each target peer node of the plurality of target peer nodes from the resource record peer node.

According to a third aspect of the invention, there is provided a resource record peer node for use in a P2P communication network. The resource record peer node is provided with a first receiver for receiving messages from a plurality of target peer nodes in the P2P network. The messages include geographical location information relating to each target peer node of the plurality of target peer nodes. These messages are optionally registration messages. The resource record peer node is also provided with a memory for storing a record of the identity of the each target peer node and the geographical location information relating to each target peer node. A second receiver is provided for receiving a request for geographical location information relating to at least some of the plurality of target peer nodes. The request is received from a requesting peer node. A processor is provided for processing the request and retrieving geographical information from the memory, and a transmitter is provided for sending the geographical location information relating to target peer nodes for which geographical information was requested.

According to a fourth aspect of the invention, there is provided a target peer node for use in a P2P communication network. The target peer node is provided with a receiver for receiving from a requesting peer node a request for geographical location information relating to the target peer node. It is further provided with a transmitter for sending a response to the request, the response including geographical location information relating to the target peer node. By sending geographical location information to the requesting peer node, the requesting peer node is able to select one or more target peer nodes based on their location.

DETAILED DESCRIPTION

When a peer wishes to communicate with other peers in a P2P network, it requests geographical location information for selected peer nodes. Once the peer node has received the requested information, it can make a decision as to which of the selected peer nodes it will communicate on the basis of the geographical information.

Figure 1:
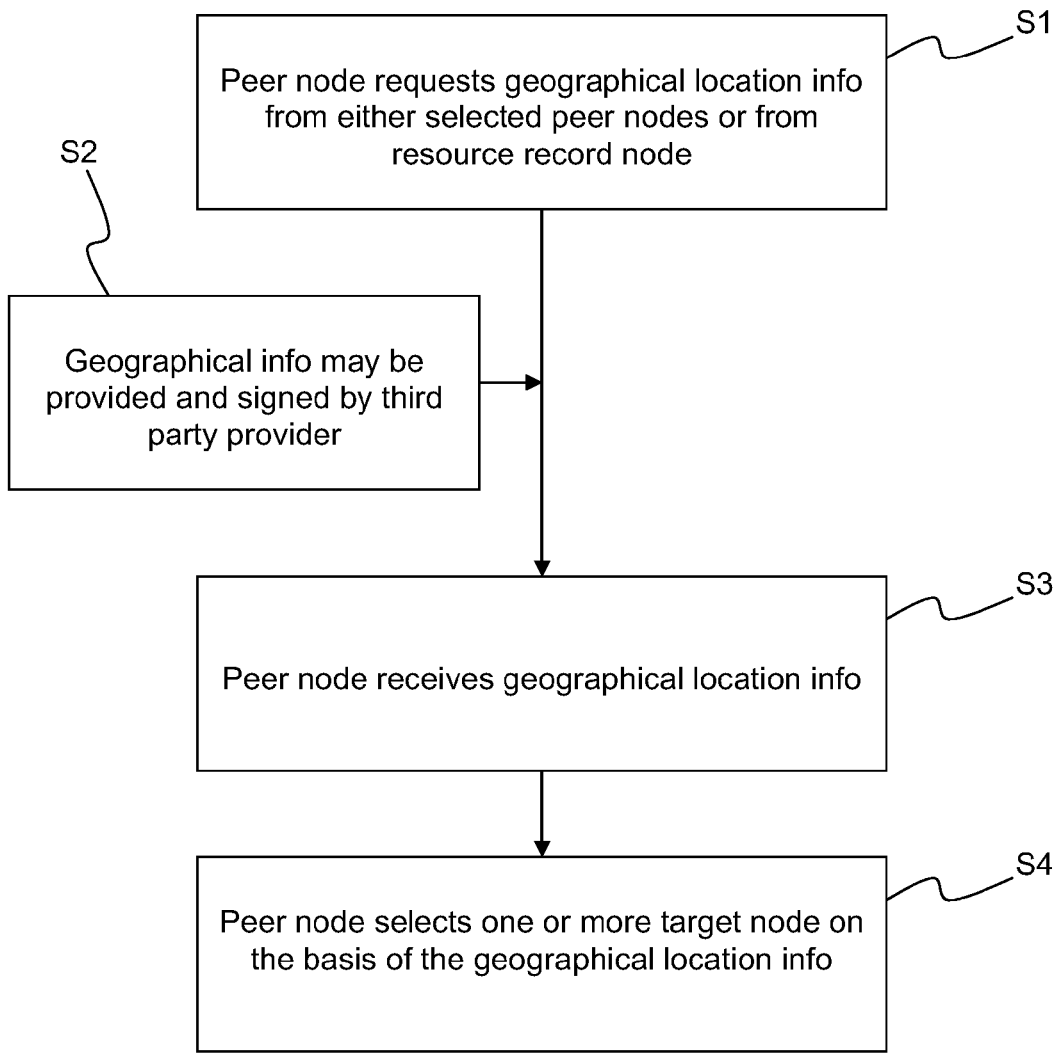
FIG. 1 is a flow diagram illustrating the steps according to an embodiment of the invention.

FIG. 1 illustrates the steps of the invention. The following numbering corresponds to the numbering of FIG. 1.

S1. A peer node requests geographical location information relating to a plurality of target peer nodes. The request may be sent to a plurality of target peer nodes, or to a single resource record peer node, as described in the various embodiments below.

S2. In an optional embodiment, as described in more detail below, the geographical information may be provided by a third party provider, and may also be signed by the third party provider.

S3. The peer node, as a result of the request, receives geographical location information for each target peer node of the plurality of target peer nodes. Geographical location information may be provided and signed or encrypted by a third part geo-location provider as well.

S4. On the basis of the received geographical information, the peer node selects one or more target peer nodes with which to communicate.

Figure 2:
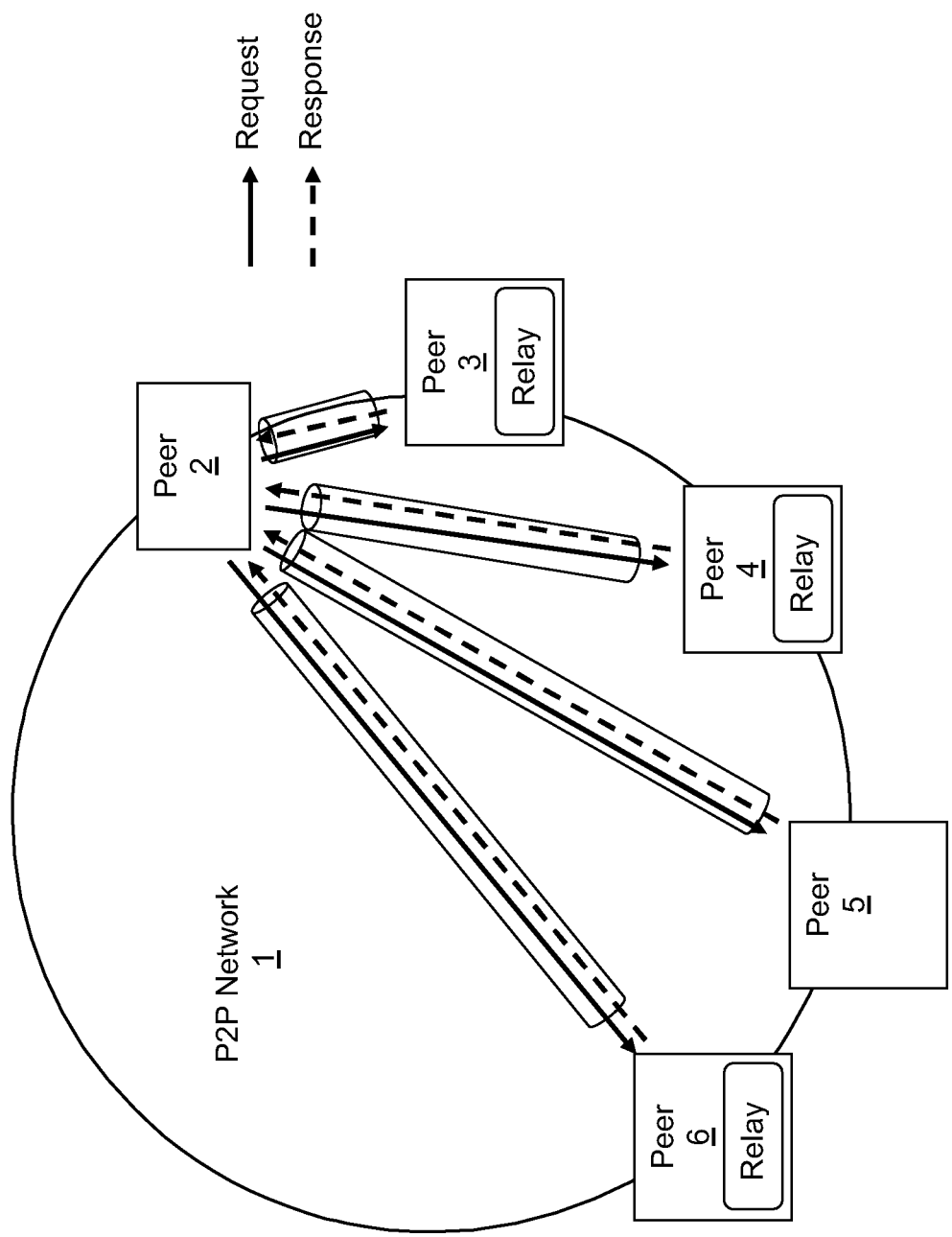
FIG. 2 illustrates schematically in a block diagram a P2P network and signalling according to an embodiment of the invention.

There are several ways in which a peer node can obtain geographical location information for other peer nodes in the P2P network. The first is termed herein "targeted flooding". Referring to FIG. 2, a P2P network 1 is shown. The requesting peer node 2 has existing connections with other peer nodes 3, 4, 5, 6 in the P2P network 1. In this example, the requesting peer node 2 requires a relay service, which is available from peer nodes 3, 4 and 6, but not from peer node 5.

The requesting peer node 2 uses a Distributed Hash Table (DHT) algorithm to determine possible sources of the requested service, and a typical query method can be seen as targeted flooding. The lookup query request is sent to all neighbours as shown FIG. 1 as solid arrows. In addition to the request asking each peer node what service is available, the request also asks for the geographical location of each peer node. Each peer node 3, 4, 5, 6 responds to the request providing information about the available services from that peer, and also providing geographical location information for that node. The response is shown in FIG. 1 as dashed arrows.

Based on the replies, and the geographical location information contained within those replies, the requesting node 2 can make a decision as to which relay service it should use.

Due to the distributed nature of a P2P network, a P2P network implementing this method is highly fault-tolerant, as operation of the network will not be interrupted if one or more of the peers go offline.

Figure 3:
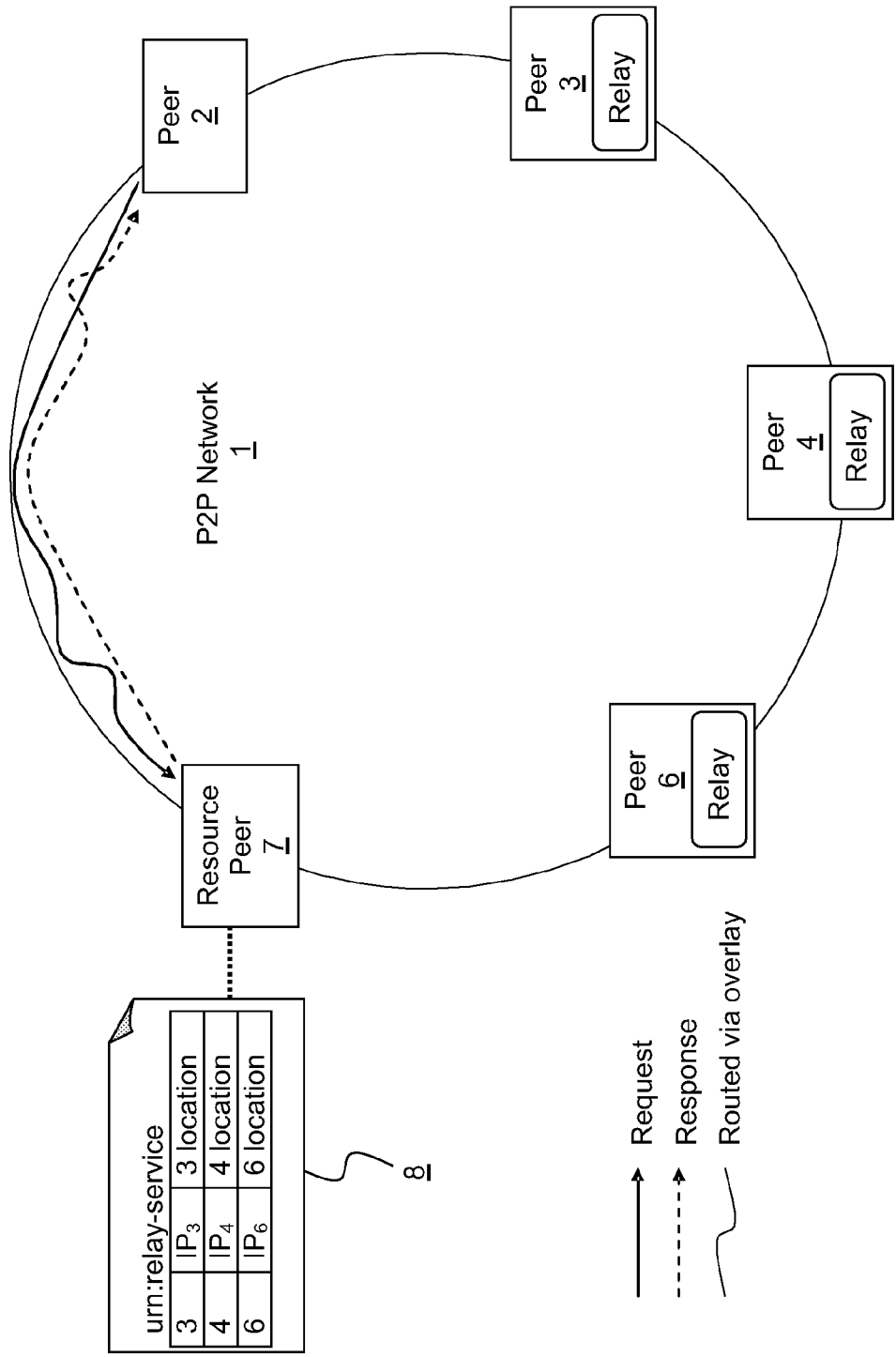
FIG. 3 illustrates schematically in a block diagram a P2P network and signalling according to an alternative embodiment of the invention.

In an alternative embodiment, a resource record peer node contains a resource record that lists the location of peer nodes in the P2P network, and maps the location of each peer to the peer ID. Referring to FIG. 3 herein, the resource record peer node 7 is shown. Peer nodes in the P2P network transmit their geographical location data to the resource record peer 7, and the resource record peer 7 maintains this information in a resource record 8. Geographical location information may be provided and signed or encrypted by a third part geo-location provider as well. The resource record 8 lists all of the peer nodes that can provide a particular service or content (in this example, a relay service) along with their IP address and their location. The requesting peer node 2 can request this information from the resource record peer node 7 when it needs to select a peer node to provide the relay service, and the resource record peer node 7 responds (dashed line) with a list of peers and their geographical location information from which the requesting peer node 2 can make a selection.

There are existing mechanisms for the requesting peer 2 to find responsible nodes. Examples of such mechanisms can be found in P2PSIP WG. IETF http://www.ietf.org/html.charters/p2psip-charter.html. These mechanisms can also be used for finding the resource record peer node 7. Of course, in order to provide redundancy, several peer nodes in the P2P network may act as resource record peer nodes.

The geographical location information may be provided in any way that defines a geographical location of a peer node. For example, a peer node may obtain Global Positioning Satellite Co-ordinates and use those as the geographical location information. Alternatively, a proprietary service such as Ericsson's Mobile Positioning Service (MPS) may be used to provide geographical information. In another embodiment, the peer node may be provided with a street address, zip code or post code as the geographical location information. Geographical location information may input by a user, or determined automatically by the peer node. Geographical location information may be provided and signed or encrypted by a third part geo-location provider. This is particularly useful where the information is used to determine the degree of trust that can be accorded to a peer node based on its geographical location.

Figure 4:
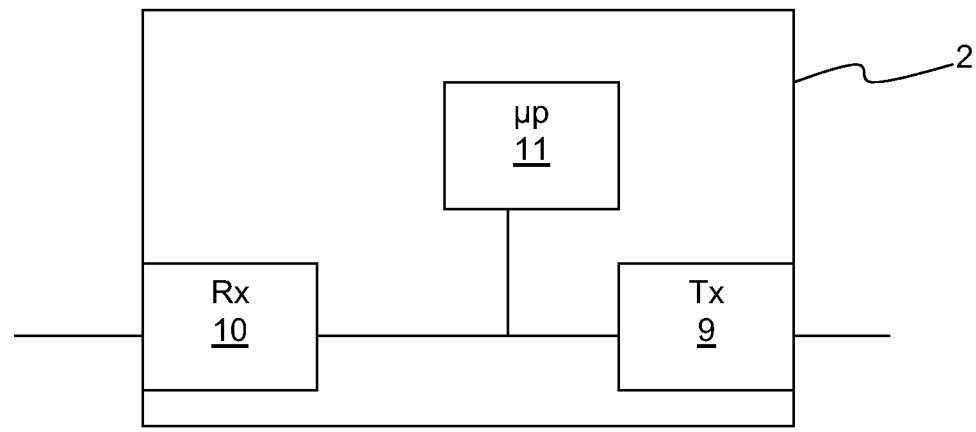
FIG. 4 illustrates schematically in a block diagram a requesting P2P network node according to an embodiment of the invention.

Turning now to FIG. 4, there is illustrated a requesting peer node 2 according to an embodiment of the invention. A transmitter 9 is provided for sending a request for geographical location information relating to the target peer nodes. As described above, this request may be sent either to all target peer nodes 3, 4, 5, 6 or to one or more resource record peer nodes 7. A receiver 10 is provided for responses to the request. Once the requesting peer node 2 has obtained the required geographical location information, a processor 11 is used to select one or more target peer nodes on the basis of the received geographical information.

Figure 5:
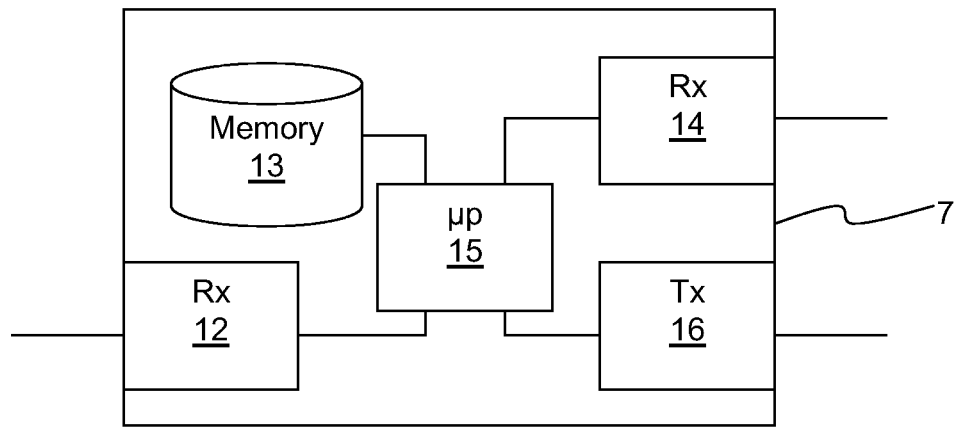
FIG. 5 illustrates schematically in a block diagram a responding P2P network node according to an embodiment of the invention.

Referring to FIG. 5, there is illustrated a resource record peer node 7. A first receiver 12 is provided for receiving registration messages from all of the peer nodes in the P2P network. The registration messages include geographical location information for each of the peer nodes. A memory 13 is provided for storing a record of the identity and the geographical location information for each peer node. A second receiver 14 (which may or may not be the same physical receiver as the first receiver) is provided for receiving from a request from the requesting peer node 2 for geographical location information relating to at least some of the peer nodes in the P2P network. A processor 15 processes the request and retrieves the required geographical information from the memory 13. A transmitter 16 sends the geographical location information for the requested peer nodes to the requesting peer node 2.

Figure 6:
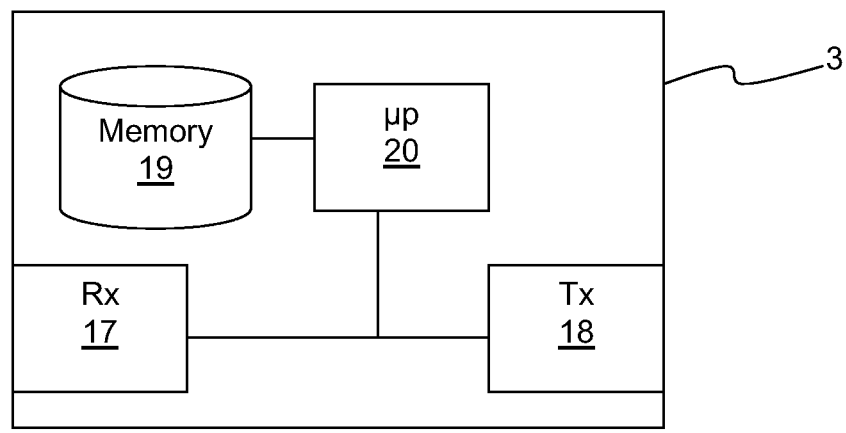
FIG. 6 illustrates schematically in a block diagram a resource record P2P network node according to an embodiment of the invention.

FIG. 6 illustrates a peer node according to another embodiment of the invention. The peer node 3 comprises a receiver 17 for receiving a request for geographical location information from the requesting peer node 2. A transmitter 18 is also provided for sending a response to the request, the response including the requested geographical location information. This information may be determined on the fly, or may be stored in a memory 19 and retrieved by a processor 20 before sending the response.

The invention provides a method that allows peers to request geographical information. This method allows service providers to offer significantly better user experience for their P2P systems based on geographical location information of peer nodes. Some of these benefits are:

Trust: Trust and reputation are important for secured and trustworthy P2P overlay communications among peers. Peers located in certain areas could be more trusted than other peers. It is possible to create a circle of trust and request information only to the peers inside these circles. This feature cannot be provided using latency-based mechanisms.

Geographical proximity: Geographical proximity is an important factor in P2P overlay networks. It is especially important when a peer is choosing another peer to provide media processing services (e.g. relay or transcoding).

Geographical information: Geographical information could also be used for limiting the service provisioning to a certain location. In this scenario, peer nodes requesting a service in a P2P network would have to disclose their geographical location to the peer node providing a service (note that the geographical location information could be signed by third party geo-location providers). This is especially important in the example where a P2P network includes peers in more than one legislative region (e.g. European Union/Russia). This feature cannot be provided using latency-based mechanisms.

It will be appreciated by the person of skill in the art that various modifications may be made to the above-described embodiments without departing from the scope of the present invention.

The invention claimed is:

1. A method of selecting a peer node in a peer to peer network, the method comprising:
   at a requesting peer node, requesting geographical information relating to a plurality of target peer nodes, wherein a request is sent to each target peer node of the plurality of target peer nodes;
   as a result of the request, receiving geographical information for each target peer node of the plurality of target peer nodes, wherein a response is received from each target peer node of the plurality of target peer nodes; and
   selecting ones of the plurality of target peer nodes based on a respective levels of trust associated with the received geographical information therefor;
   creating a circle of trust including the ones of the plurality of target peer nodes; and
   limiting content and/or services with regard to the ones of the plurality of target peer nodes included in the circle of trust based on respective legislative regions associated therewith.

2. The method according to claim 1, wherein the request for geographical information is included in a request message relating to services provided, and wherein the response received from each target peer node includes the geographical information therefor and indicates a respective service provided thereby.

3. The method according to claim 1, wherein the geographical information is selected from any of a civil location, Global Positioning Satellite data, map co-ordinates, and proprietary location information.

4. The method according to claim 1, wherein the geographical information is provided by a third party node.

5. The method according to claim 4, wherein the third party node signs the geographical information, allowing each target peer node of the plurality of target peer nodes to authenticate their geographical location information.

6. A peer node for use in a peer to peer network, the peer node comprising:
   a transmitter operable to send a request for geographical location information relating to a plurality of target peer nodes, wherein the transmitter is arranged to send the request for geographical location information to each target peer node of the plurality of target peer nodes;

a receiver operable to receive geographical location information for each target peer node of the plurality of target peer nodes, wherein the receiver is arranged to receive geographical location information from each target peer node of the plurality of target peer nodes; and a processor operable to select ones of the plurality of target peer nodes based on respective levels of trust associated with the received geographical location information therefor, create a circle of trust including the ones of the plurality of target peer nodes, and limit content and/or services with regard to the ones of the plurality of target peer nodes included in the circle of trust based on respective legislative regions associated therewith.

7. A target peer node for use in a peer to peer communication network, the target peer node comprising;
- a receiver operable to receive from a requesting peer node a request for geographical location information relating to the target peer node; and
- a transmitter operable to send a response to the request, the response including geographical location information that is indicative of a level of trust relating to the target peer node,
- wherein the target peer node is selected from among a plurality of target peer nodes and included in a circle of trust based on the level of trust associated with the geographical location information therefor, and wherein content and/or services are limited to ones of the plurality of target peer nodes included in the circle of trust based on respective legislative regions associated therewith.

8. The method according to claim 1, wherein selecting the ones of the plurality of target peer nodes comprises selecting the ones of the plurality of target peer nodes on the basis of a geographic proximity indicated by the received geographical information therefor.

9. The method according to claim 2, wherein the request message corresponds to a relay service, and further comprising:
- determining the ones of the plurality of ta=t peer nodes as respective sources of the relay service using a distributed hash table algorithm,
- wherein the selecting of the ones of the plurality of target peer nodes based on the respective levels of trust associated with the received geographical information therefor is performed responsive to the determining.

* * * * *